Aug. 26, 1958   M. VETRI   2,849,041
ATTACHMENT FOR A SCREW DRIVER HANDLE
Filed May 9, 1957
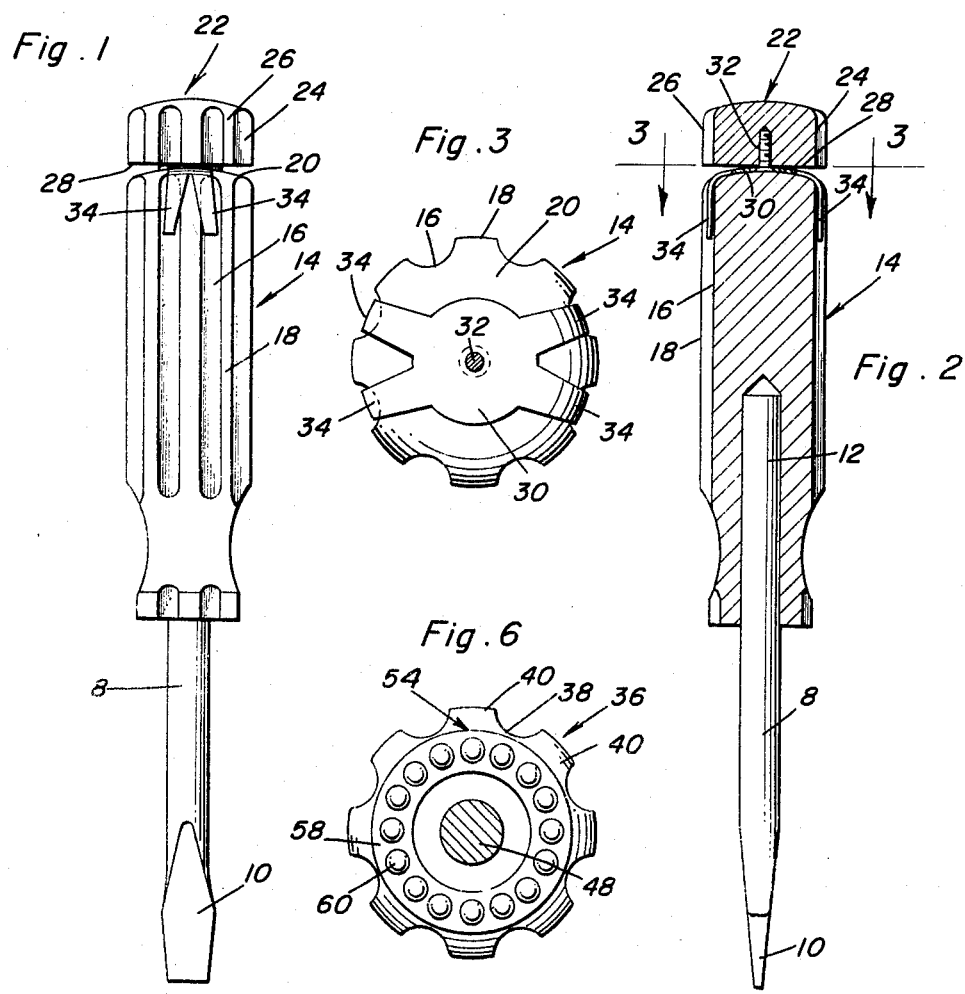
Michael Vetri
INVENTOR.

United States Patent Office 2,849,041
Patented Aug. 26, 1958

2,849,041
ATTACHMENT FOR A SCREW DRIVER HANDLE

Michael Vetri, Hasbrouck Heights, N. J.

Application May 9, 1957, Serial No. 658,097

1 Claim. (Cl. 145—61)

The present invention relates to certain new and useful improvements in tool handles wherein, for example, the tool is characterized by a shank such as is employed, for example, in the construction of a screw driver, and wherein the handle is fixedly secured to the proximal end of the shank. More particularly, the invention has to do with a handle having a swivelly mounted end thrust member, herein referred to as a freely turnable head, and which enables the user to operate the screw driver with one hand in close quarters and places difficult of access, leaving the other hand free for performance of other attending work requirements.

In the art to which the invention relates similarly constructed and performing handles are said to have improved palm rests, turnable end caps, swivel knobs and so on. In the instant presentation the improved part, as already touched upon, pertains to a swivelly mounted end thrust head or knob and the obvious object is to structurally, functionally and otherwise improve upon analogous prior art adaptations. To this end the improvement offered is characterized by a shank having a blade at its distal end, a gripping and turning handle fixed to the proximal end of said shank, an end thrust head axially aligned with said handle, a separate headed fastener swivelly securing said head to the proximal end of said handle, and friction reducing means held in place by said headed fastener and operatively and cooperatively interposed between the proximal end of said handle and the adjacent pressure exerting face of said head, said means being prefabricated and readily applicable and removable.

More specifically novelty is predicated on the construction recited and wherein the stated means comprises a prefabricated ready-to-use ball bearing race which comprises upper and lower parallel rings with intervening balls and which is interposed between the handle and head and is held in place by the headed fastener.

Then, too, novelty is predicated on the provision of the thrust head as an attachment for a conventional screw driver handle having a fluted construction. In this adaptation the head is provided with a washer and the washer in turn is provided with attaching and retaining fingers.

Other objects, features and advantages will become more readily apparent from the following description and the accompanying drawing.

In the accompanying drawing wherein like numerals are employed to designate like parts throughout the views:

Fig. 1 is a side elevation of a screw driver and an improved end thrust member or head to be made and sold separately as an attachment and which when applied achieves the stated objectives;

Fig. 2 is a view in section and in elevation of the same;

Fig. 3 is an enlarged view taken on the horizontal line 3—3 of Fig. 2, looking in the direction of the arrows;

Fig. 4 is a fragmentary elevational view wherein the end thrust swivel head is a part of the handle itself;

Fig. 5 is a section, partly in elevation, on the vertical line 5—5 of Fig. 4; and Fig. 6 is an enlarged view on the section line 6—6 of Fig. 5.

From a generic point of view the invention, whether it be construed as an attachment (Fig. 1) or built as a part of the hanlde (Fig. 4) involves an end thrust head axially aligned with the handle. Anti-friction reducing means, with or without ball bearings, is interposed between cooperating surfaces of the end of the handle and the head and the means is precision made and prefabricated and is held in place by a headed fastener and is readily applicable and removable.

Specifically and with reference to Figures 1 to 3 the numeral 8 designates a shank having a tool such as a blade or bit 10 at its working end and the other end portion 12 (Fig. 2) is embedded in the plastic or equivalent handle 14. This is a common type of a handle and has a fluted surface with the grooves denoted at 16 and the ribs at 18. The upper or proximal end of the handle is convex at 20.

The attachment here comprises a head 22 which is also sometimes referred to as an attachable knob and which has a fluted surface with the grooves denoted at 24 and the ribs 26. It has a flat bottom 28 opposed to the convex end 20. The numeral 30 designates a concavo-convex washer which conforms to the end 20 and which is simply secured by a headed screw or equivalent fastener 32 to the end thrust head 22. The peripheral portion of the washer is provided at diametrically opposite sides with pairs of divergent attaching and retaining fingers 34 which are curved and bent so that they seat themselves and are retained in the grooves 16 and at the same time straddle the intervening ribs 18. The end thrust head 22 may be therefore said to be provided with a rotatably attached clip the clip having fingers and serving to clasp the end of the screw driver handle in the manner shown.

In the form of the invention seen in Figs. 4 to 6 the handle 36 has fluted grooves and ribs 38 and 40 respectively and the surfaces 42 and 44 of the handle and head 46 are opposed and secured by passing the threaded shank 48 of a screw 50 through a centered hole 52 in the head. Then the ball race 54 is interposed between the surfaces 42 and 44 and is made up of upper and lower rings 56 and 58 and intervening ball bearings 60.

Any dimensions shown do not necessarily hold firm, for any size handle may be manufactured, and in relation to size of handle, various parts may be changed in size, either enlarged or made smaller.

The operation of this tool is primarily intended to eliminate the inevitable friction and/or gouging of the palm of hand when using the conventional tool.

When this tool is used in the normal way by applying pressure by hand against the screw to be turned and by twisting the wrist in the direction desired, the turnable head remains firm in palm of hand, thus allowing the user to turn a screw (not shown) without removing screw driver from screw slot or kerf, each time a turn is made.

And finally, this tool may be used with one or both hands quite rapidly for any length of time with no irritation to palm of hand.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

An end thrust and rotating attachment for the outer end of a fluted screw driver handle comprising a generally circular marginally fluted end thrust head having a flat bottom face, a concavo-convex washer, a headed fastener securing said washer centrally to the flat face of said head, said washer being of a diameter less than the diameter of said head, the outer peripheral edge of said washer having diametrically opposite pairs of springy metal fingers, the fingers of each pair being in divergent relationship and suitably curved and shaped to resiliently embrace and clasp the end portion of a screw driver handle.

References Cited in the file of this patent

UNITED STATES PATENTS

| | | |
|---|---|---|
| 431,959 | Young | July 8, 1890 |
| 1,952,395 | Tillyer et al. | Mar. 27, 1934 |
| 2,324,839 | Haumerson | July 20, 1943 |
| 2,351,705 | Prall | June 20, 1944 |
| 2,743,749 | Lowry | May 1, 1956 |

FOREIGN PATENTS

| | | |
|---|---|---|
| 209,228 | Great Britain | Jan. 10, 1924 |